US012579249B2

(12) United States Patent
Manley et al.

(10) Patent No.: US 12,579,249 B2
(45) Date of Patent: Mar. 17, 2026

(54) SYSTEMS AND METHODS FOR AUTHENTICATION

(71) Applicant: Truist Bank, Charlotte, NC (US)

(72) Inventors: Alexis Danielle Manley, Winston Salem, NC (US); Sidharth Garg, Atlanta, GA (US)

(73) Assignee: TRUIST BANK, Charlotte, NC (US)

(*) Notice: Subject to any disclaimer, the term of this patent is extended or adjusted under 35 U.S.C. 154(b) by 168 days.

(21) Appl. No.: 18/064,471

(22) Filed: Dec. 12, 2022

(65) Prior Publication Data

US 2024/0193256 A1     Jun. 13, 2024

(51) Int. Cl.
G06F 21/45          (2013.01)

(52) U.S. Cl.
CPC .................................... G06F 21/45 (2013.01)

(58) Field of Classification Search
None
See application file for complete search history.

(56) References Cited

U.S. PATENT DOCUMENTS

| | | | | |
|---|---|---|---|---|
| 10,257,202 | B1 * | 4/2019 | Jiang ..................... | G06F 21/313 |
| 2013/0282589 | A1 * | 10/2013 | Shoup ..................... | G06F 21/34 |
| | | | | 726/5 |

| | | | | |
|---|---|---|---|---|
| 2017/0195339 | A1 * | 7/2017 | Brown ................ | H04L 63/0861 |
| 2018/0103341 | A1 * | 4/2018 | Moiyallah, Jr ..... | G06F 3/04842 |
| 2019/0166118 | A1 * | 5/2019 | Lee ........................ | H04W 12/06 |
| 2020/0125714 | A1 * | 4/2020 | Kubota ................... | G06F 21/45 |
| 2020/0162255 | A1 * | 5/2020 | Hunt ..................... | H04L 63/083 |
| 2020/0233949 | A1 * | 7/2020 | Xia ........................ | H04W 12/08 |
| 2020/0327219 | A1 * | 10/2020 | Bolimovsky ......... | H04W 12/68 |
| 2020/0380108 | A1 * | 12/2020 | Cypriano ............... | G06F 21/32 |
| 2021/0256111 | A1 * | 8/2021 | Ilincic .................... | H04L 63/083 |
| 2023/0028416 | A1 * | 1/2023 | Mason ................... | H04L 63/20 |

FOREIGN PATENT DOCUMENTS

| | | | | |
|---|---|---|---|---|
| TW | M635540 U | * 12/2022 | ......... | H04L 63/0838 |

* cited by examiner

*Primary Examiner* — Philip J Chea
*Assistant Examiner* — Bin Qing Zheng
(74) *Attorney, Agent, or Firm* — Michael A. Springs, Esq.; Shumaker, Loop & Kendrick, LLP; Patrick B. Horne

(57)          ABSTRACT

A system and method for a password-free authentication experience that further allows for dual-device authentication is described. The system allows a user to choose an alternative authentication method on a first device which includes the use of a unique code to couple the authentication process with a second device. The alternative authentication method may include the use of biometric authentication methods on the second device. Further the systems and methods allow a user to disable authentication methods for added security.

14 Claims, 7 Drawing Sheets

260

RECEIVING A USER AUTHENTICATION          261

VALIDATING USER BASED ON THE USER
AUTHENTICATION          262

RECEIVING REQUEST TO DISABLE AN AUTHENTICATION
METHOD          263

DISABLING THE AUTHENTICATION METHOD          264

270

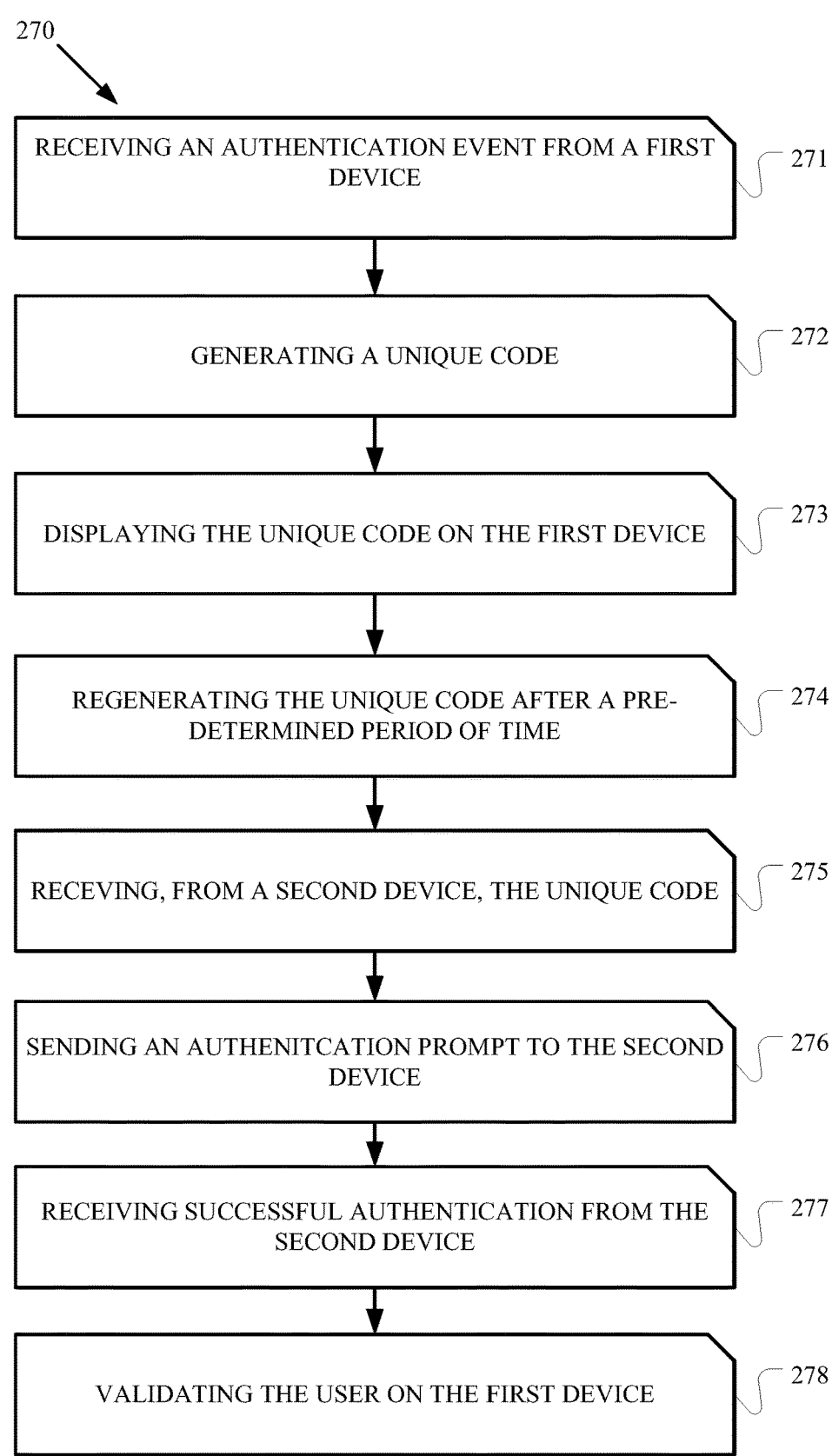

RECEIVING AN AUTHENTICATION EVENT FROM A FIRST DEVICE — 271

GENERATING A UNIQUE CODE — 272

DISPLAYING THE UNIQUE CODE ON THE FIRST DEVICE — 273

REGENERATING THE UNIQUE CODE AFTER A PRE-DETERMINED PERIOD OF TIME — 274

RECEIVING, FROM A SECOND DEVICE, THE UNIQUE CODE — 275

SENDING AN AUTHENITCATION PROMPT TO THE SECOND DEVICE — 276

RECEIVING SUCCESSFUL AUTHENTICATION FROM THE SECOND DEVICE — 277

VALIDATING THE USER ON THE FIRST DEVICE — 278

SYSTEMS AND METHODS FOR AUTHENTICATION

FIELD

This invention is related generally to the field of authentication and user verification, and more particularly embodiments of the invention relate to methods of authenticating a user without a password.

BACKGROUND OF THE INVENTION

Historically, the preferred method for logging into an account is with a username and password combination. However, in recent years the security of this method has been questioned as passwords and PINs can be stolen. Another issue with the username and password combination includes the struggle of remembering not only a username but also a password for multiple accounts.

For this reason, biometric authentication is becoming increasingly popular. Biometric authentication methods don't require users to remember a long complicated password. Nor are biometric authentication credentials easy to counterfeit. Biometric authentication methods require physical verification of a user through facial recognition, fingerprint recognition, iris or retinal recognition, as well as others.

However, not all devices are configured to receive biometric authentication. Biometric authentication typically requires a fingerprint reader, a high-quality camera, retina and/or iris scanner(s), high-quality speakers, etc.

BRIEF SUMMARY

Embodiments of the present invention address the above needs and/or achieve other advantages by providing apparatuses and methods that allow a user to authenticate without a password and/or authenticate using a second device.

Aspects of the invention include a system for password-free authentication, the system includes at least one processor, a communication interface communicatively coupled to the at least one processor, and a memory device storing executable code. The executable code, when executed causes the at least one processor to: receive, from a user on a first device, an authentication event, or a request to log in to the user's account; generate a unique code associated with the authentication event; display the unique code to the user on the first device; receive, from the user on a second device (a mobile device), the unique code; and send an authentication prompt to the user on the second device invoking the user's authentication.

In some embodiments, after receiving, from the user on the second device, a successful authentication the system will validate the user on the first device.

In some embodiments, to enable the user to disable future password authentication, the system is configured to receive, from the user on the first device, a user authentication; validate the user based on the user authentication; receive a request from the user to disable an authentication method; and disable the authentication method based on the request. In some embodiments, the user authentication includes a username and password combination. In some embodiments, the disabled authentication method includes the username and password combination authentication method.

Another aspect of the invention, includes a method for password-free authentication. The method includes: receiving, from a user on a first device, an authentication event, or a request to log in to the user's account; generating a unique code associated with the authentication event; displaying the unique code to the user on the first device; receiving, from the user on a second device (a mobile device), the unique code; and sending an authentication prompt to the user on the second device requesting, or invoking, the user's authentication.

In some embodiments, to enable the user to disable future password authentication, the method further includes: receiving, from the user on the first device, a user authentication; validating the user based on the user authentication; receiving a request from the user to disable an authentication method; and disabling the authentication method based on the request. In some embodiments, the user authentication includes a username and password combination. In some embodiments, the disabled authentication method includes the username and password combination authentication method.

In some embodiments, the successful authentication on the second device includes a biometric authentication. The biometric authentication may include: a fingerprint-scan, a facial-scan, a retinal-scan, an iris-scan, a voice-scan, and/or a vascular-scan.

In some embodiments, the second device is not pre-associated with the user.

In some embodiments, the system is configured to regenerate the unique code after a pre-determined period of time.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
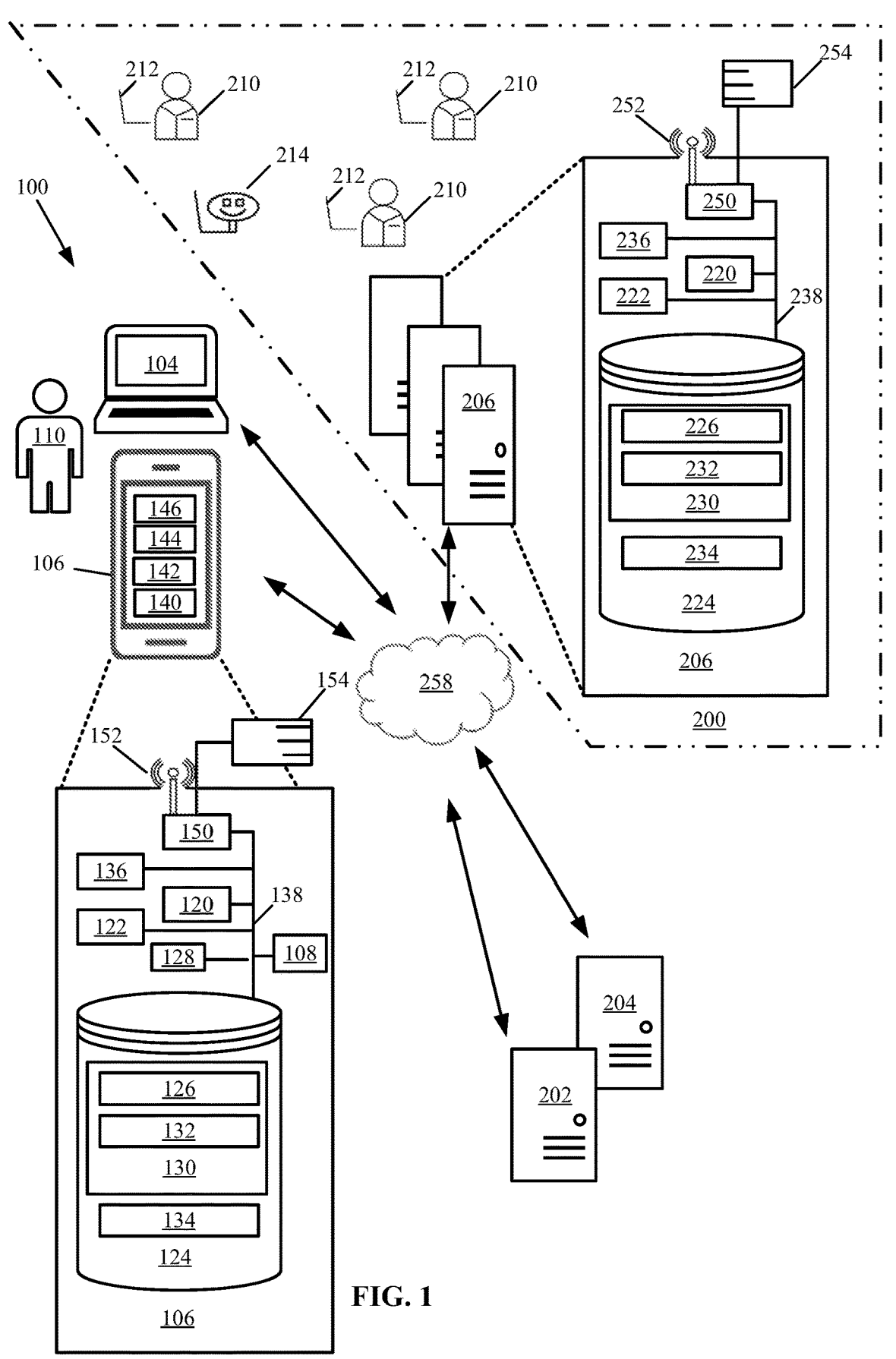
Figure 2A:
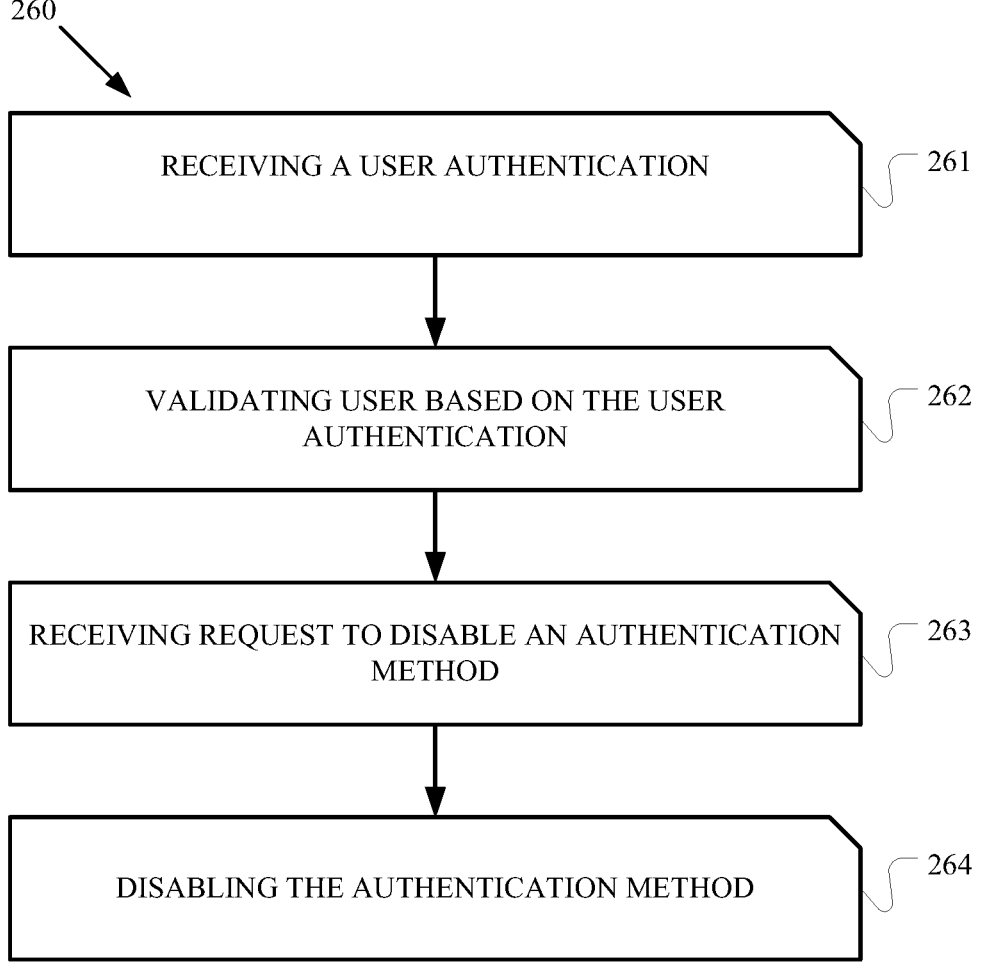

Having thus described embodiments of the invention in general terms, reference will now be made to the accompanying drawings, wherein:

FIG. 1 is an enterprise system and environment thereof for password-less authentication, in accordance with an embodiment of the present invention;

FIG. 2A is a flowchart for the method of password-free authentication in accordance with an embodiment of the present invention.

FIG. 2B is a flowchart for the method of password-free authentication in accordance with an embodiment of the present invention.

Figure 3B:
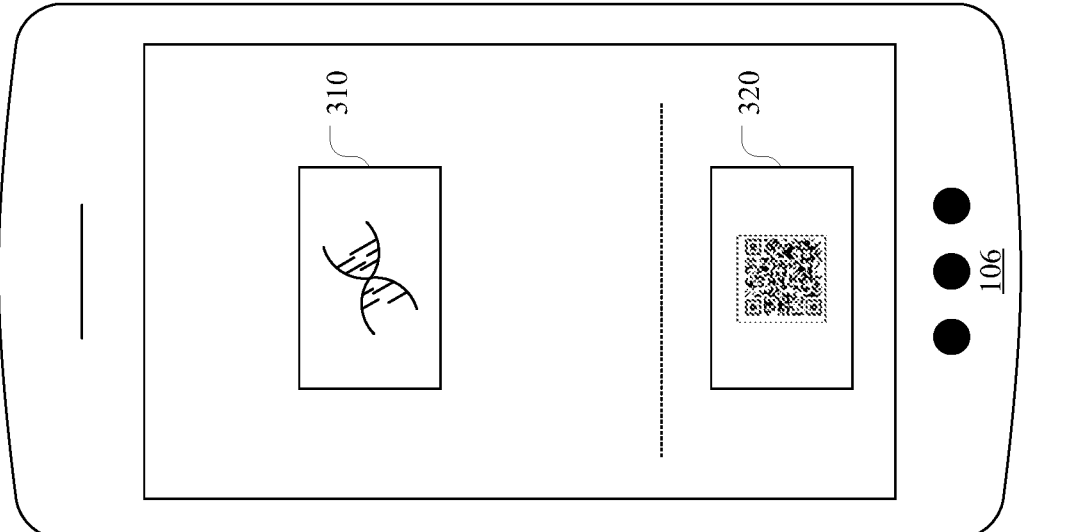
Figure 3A:
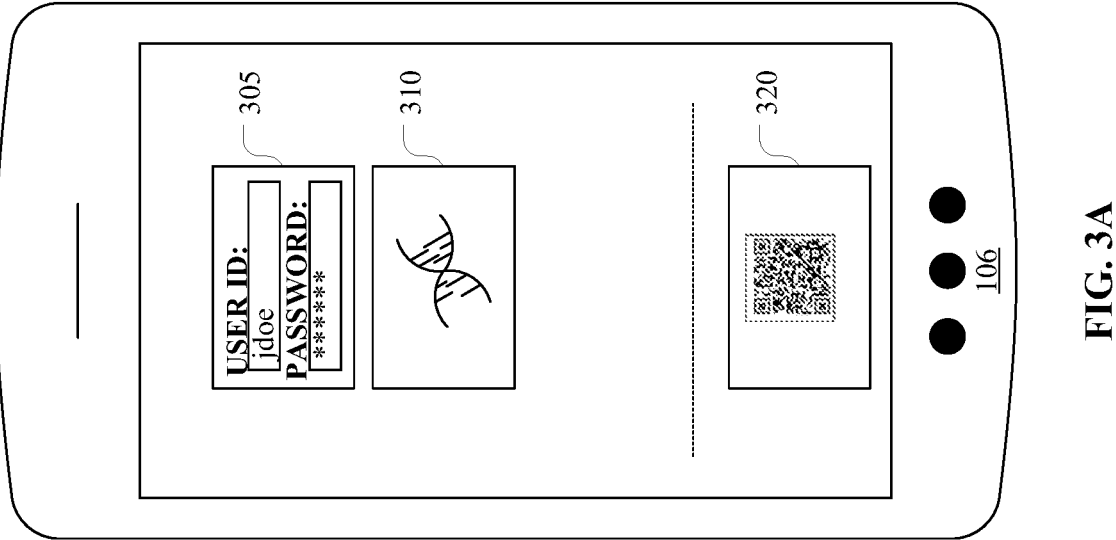

FIG. 3A is an exemplary user display in accordance with an embodiment of the present invention.

FIG. 3B is an exemplary user display in accordance with an embodiment of the present invention.

Figures 4A, 4B:
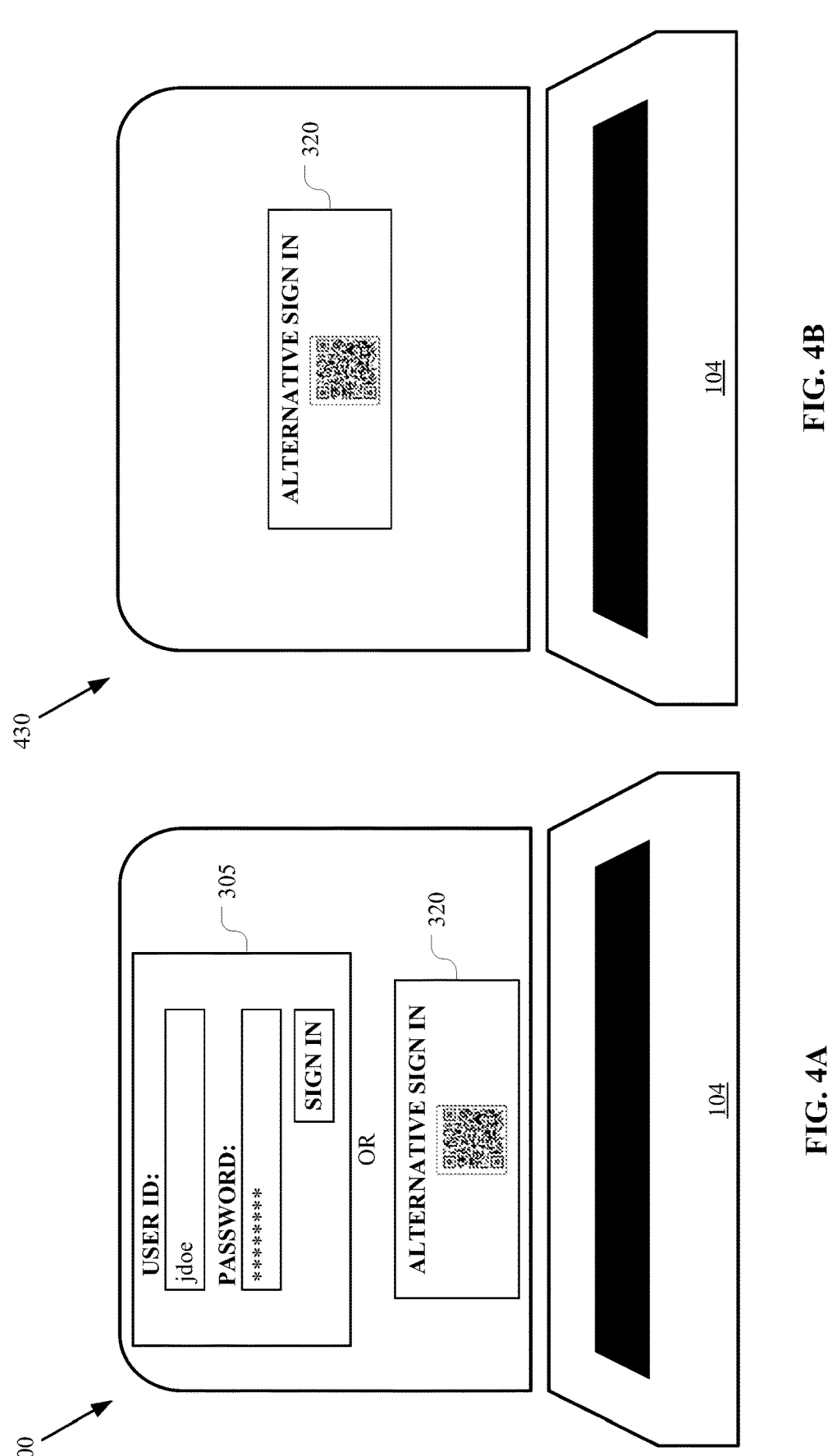

FIG. 4A is an exemplary user display in accordance with an embodiment of the present invention.

FIG. 4B is an exemplary user display in accordance with an embodiment of the present invention.

Figure 4C:
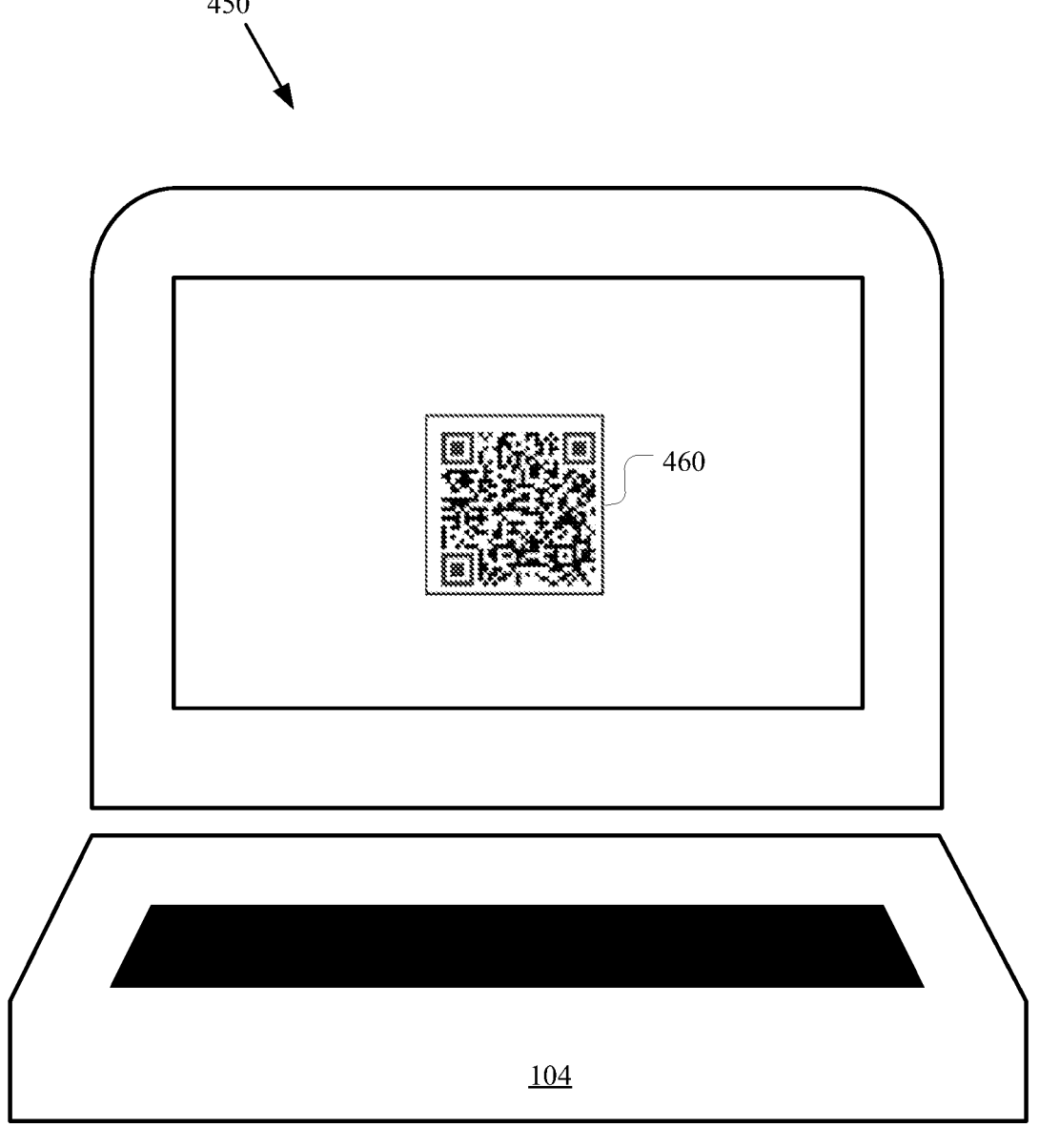

FIG. 4C is an exemplary user display in accordance with an embodiment of the present invention.

Figure 5:
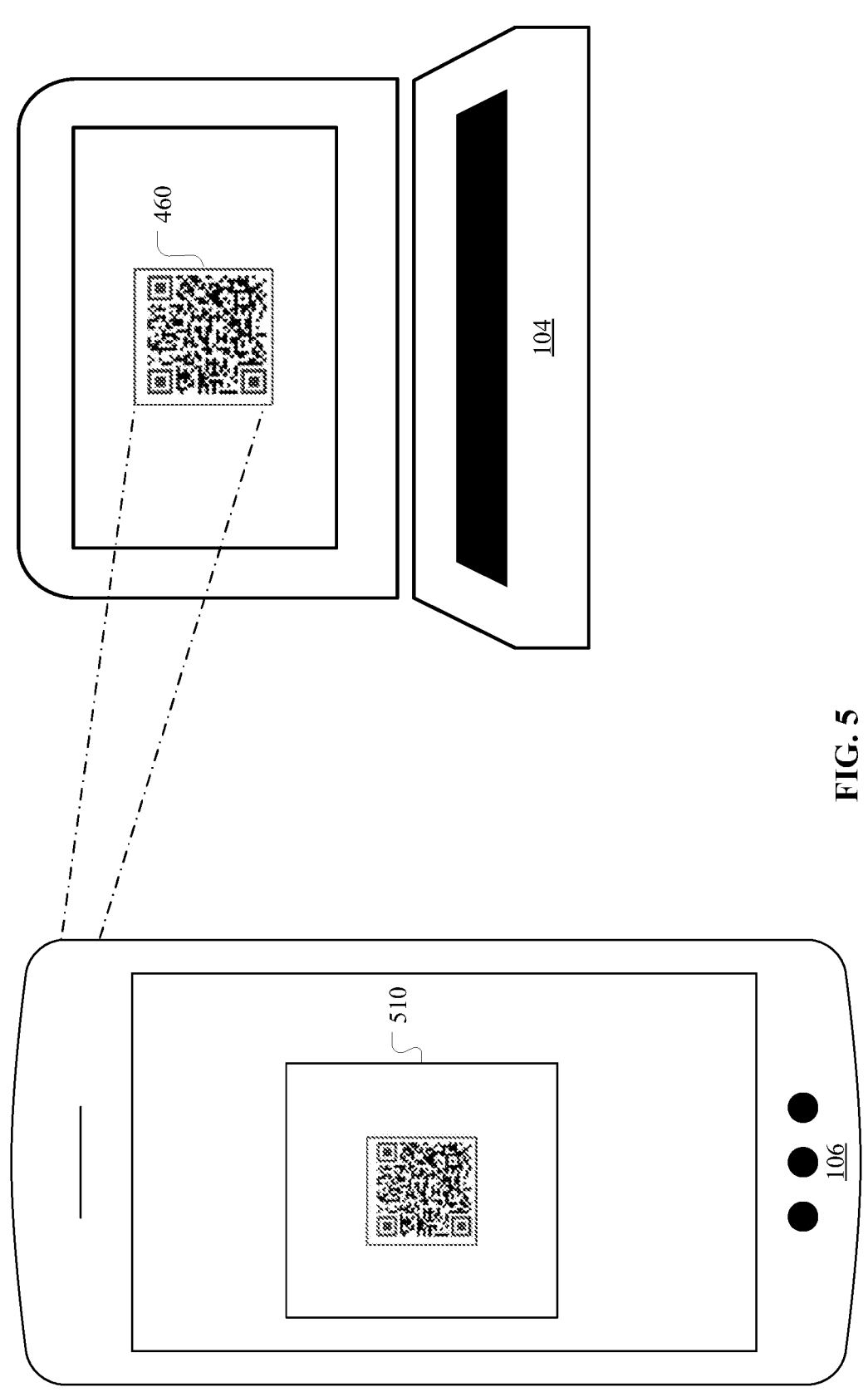

FIG. 5 illustrates an exemplary method of communicating the unique code from the first device to the second device, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

The systems and methods described herein are intended to solve the problems associated with the use of a username and password combination as an authentication method, as well as provide systems and methods for validating a user using a second device. Using the system and method described herein, a user can access on a first device, for example a personal computer such as the computing device 104 described above, a login screen and request to login using a second device, such as mobile device 106. The user can use the second device to scan a unique code associated with this login event which will prompt the user for authentication credentials on the second device. The user can authenticate using a biometric login on the second device and this will validate the user on the first device. This allows for authenticating on a second device as well as password-free authentication. This is useful when a user would like to use biometric authentication but the device they want to login from does not have the ability to receive biometric data. Additionally, the user can request that a username and password combination not be used to login to their account, and only biometric login or the alternative login method described above and in more detail throughout this specification be used as authentication to validate the user. When the username and password combination authentication method is disabled for a user, the user will no longer see this as an authentication method on the login screen.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 106 and computing device 104, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera. Additionally, the mobile device 106 includes hardware and/or software configured to receive biometric data. For example, the mobile device 106 may be equipped to receive a fingerprint from the user. Additionally, the mobile device 106 may be configured to receive a facial scan from the user using the camera or other hardware/software combination. The mobile device 160 may also be equipped to receive eye scans such as retinal and/or iris scans using the camera and/or other hardware/software combination. Other hardware/software combinations may be stored on or connected to the mobile device 106 configured to receive biometric data such as voice data, vascular data, etc.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user.

Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/
b/g/n/ac, 802.20, WiMax, LTE, and/or any other wireless
link. The network 258 may include any internal or external
network, networks, sub-network, and combinations of such
operable to implement communications between various
computing components within and beyond the illustrated
environment 100. The network 258 may communicate, for
example, Internet Protocol (IP) packets, Frame Relay
frames, Asynchronous Transfer Mode (ATM) cells, voice,
video, data, and other suitable information between network
addresses. The network 258 may also include one or more
local area networks (LANs), radio access networks (RANs),
metropolitan area networks (MANs), wide area networks
(WANs), all or a portion of the internet and/or any other
communication system or systems at one or more locations.

The network 258 may incorporate a cloud platform/data
center that support various service models including Plat-
form as a Service (PaaS), Infrastructure-as-a-Service (IaaS),
and Software-as-a-Service (SaaS). Such service models may
provide, for example, a digital platform accessible to the
user device (referring to either or both of the computing
device 104 and the mobile device 106). Specifically, SaaS
may provide a user with the capability to use applications
running on a cloud infrastructure, where the applications are
accessible via a thin client interface such as a web browser
and the user is not permitted to manage or control the
underlying cloud infrastructure (i.e., network, servers, oper-
ating systems, storage, or specific application capabilities
that are not user-specific). PaaS also do not permit the user
to manage or control the underlying cloud infrastructure, but
this service may enable a user to deploy user-created or
acquired applications onto the cloud infrastructure using
programming languages and tools provided by the provider
of the application. In contrast, IaaS provides a user the
permission to provision processing, storage, networks, and
other computing resources as well as run arbitrary software
(e.g., operating systems and applications) thereby giving the
user control over operating systems, storage, deployed appli-
cations, and potentially select networking components (e.g.,
host firewalls).

The network 258 may also incorporate various cloud-
based deployment models including private cloud (i.e., an
organization-based cloud managed by either the organiza-
tion or third parties and hosted on-premises or off premises),
public cloud (i.e., cloud-based infrastructure available to the
general public that is owned by an organization that sells
cloud services), community cloud (i.e., cloud-based infra-
structure shared by several organizations and manages by
the organizations or third parties and hosted on-premises or
off premises), and/or hybrid cloud (i.e., composed of two or
more clouds e.g., private community, and/or public).

Two external systems 202 and 204 are expressly illus-
trated in FIG. 1, representing any number and variety of data
sources, users, consumers, customers, business entities,
banking systems, government entities, clubs, and groups of
any size are all within the scope of the descriptions. In at
least one example, the external systems 202 and 204 repre-
sent automatic teller machines (ATMs) utilized by the enter-
prise system 200 in serving users 110. In another example,
the external systems 202 and 204 represent payment clear-
inghouse or payment rail systems for processing payment
transactions, and in another example, the external systems
202 and 204 represent third party systems such as merchant
systems configured to interact with the user device 106
during transactions and also configured to interact with the
enterprise system 200 in back-end transactions clearing
processes.

In certain embodiments, one or more of the systems such
as the user device (referring to either or both of the com-
puting device 104 and the mobile device 106), the enterprise
system 200, and/or the external systems 202 and 204 are,
include, or utilize virtual resources. In some cases, such
virtual resources are considered cloud resources or virtual
machines. The cloud computing configuration may provide
an infrastructure that includes a network of interconnected
nodes and provides stateless, low coupling, modularity, and
semantic interoperability. Such interconnected nodes may
incorporate a computer system that includes one or more
processors, a memory, and a bus that couples various system
components (e.g., the memory) to the processor. Such virtual
resources may be available for shared use among multiple
distinct resource consumers and in certain implementations,
virtual resources do not necessarily correspond to one or
more specific pieces of hardware, but rather to a collection
of pieces of hardware operatively coupled within a cloud
computing configuration so that the resources may be shared
as needed.

FIG. 2A is a flowchart representing a method 260 for
disabling an authentication method based on a user's
request. At step 261, the system will receive user authenti-
cation from the user. This will generally include a username
and password combination. However, it may also include a
biometric authentication, and the alternative authentication
described in method 270. Upon receiving a successful
authentication, the method continues to step 262 to validate
the user based on the user's authentication. At step 263, the
system will receive, from the user, a request to disable an
authentication method. Typically, the request will be to
disable the username and password combination authenti-
cation method, however other authentication methods may
also be disabled including biometric authentication and the
alternative authentication method 270. Based on this
request, the system will proceed to step 264 which includes
disabling the requested authentication method. FIG. 3A
illustrates a mobile device 106 user interface wherein user-
name and password combination authentication 305, bio-
metric authentication 310 and alternative authentication 320
are enabled. FIG. 3B illustrates a mobile device 106 wherein
the username and password combination authentication has
been disabled, and only the biometric authentication 310 and
alternative authentication 320 remain as options for the user
to provide authentication to login to the account. FIG. 4A
illustrates a computing device 104 wherein the username
and password combination authentication method 305 is
enabled as well as the alternative sign on method 320. FIG.
4B illustrates a computer device 104 wherein the username
and password combination is disabled, and only the alter-
native sign in method 320 is enabled. In this example, the
computing device 104 is not enabled to receive biometric
data and thus the biometric authentication method is not
available. However, in some embodiments, the computing
device 104 may be enabled with hardware and/or software
configured to receive biometric data, and in that case the
biometric authentication method may be enabled.

The alternative authentication method 270 is represented
in FIG. 2B. The alternative authentication method 270 may
be initiated after the method 260 for disabling an authenti-
cation method, or alone prior to or without disabling an
authentication method. Additionally, the alternative authen-
tication method may be the disabled authentication method
from method 260.

At step 271, the alternative authentication method 270
receives an authentication event from a user on a first device.
This may include the user selecting the alternative sign-on option 320 on a computing device 104, as shown in FIGS. 4A and 4B. After receiving the authentication event, at step 272, the system will generate a unique code 460, as shown in FIG. 4C. The unique code 460 may be a bar code, a QR code, or the like. The unique code may be regenerated after a pre-determined time period, at step 274. The pre-determined time period may be 10 seconds, 30 seconds, 60 seconds, 2 minutes, or the like.

At step 275, the system will receive the unique code from the user on a second device, such as mobile device 106. As illustrated in FIG. 5, the user may use a camera on the second device, a mobile device 106, to scan and view the unique code 460 in the display 510 of the mobile device 106. In some embodiments, this is done within an entity-provided application on the mobile device 104. Additionally, or alternatively, this may be done using the camera application on the mobile device 104, where the QR code will open the entity's web-portal to initiate the next step of the method: step 276 where the system sends an authentication prompt to the second device. The authentication prompt will request, or invoke, an authentication from the user. This may be in the form of a username and password combination or biometric authentication, depending on the user's settings and which authentication methods are enabled, based on method 260. The authentication credentials requested may be biometric authentication credentials such as a fingerprint-scan, a facial-scan, a retinal-scan, an iris-scan, a voice-scan, and/or a vascular-scan. After receiving a successful authentication from the second device at step 277, the system will proceed to step 278 which includes validating the user on the first device.

The system and method described herein enables biometric authentication methods for devices not enabled with hardware/software for receiving biometric data. Additionally, the method may store the user's biometric data within the system, therefore enabling this method on a second device that isn't already pre-associated with the user's account. The systems and methods described herein may be used in combination with other technologies, systems, and methods including using GPS on the user's first and/or second device to determine that the devices are in the same location to ensure security. These systems and methods may be used by the user to access an account on their personal devices, as well as within an entity location or branch to access their account on entity-owned devices.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for alternative authentication comprising:
at least one processor;
a communication interface communicatively coupled to the at least one processor; and
a memory device storing executable code that, when executed, causes the processor to:
display, on a computing device, a selection of authentication options for authenticating a user of an online banking account, wherein the selection of authentication options comprises a username and password combination option and an alternative sign-on option, wherein the alternative sign-on option comprises authentication using a mobile device;

receive, from the computing device, from the user, an authentication event comprising a user-selection of the alternative sign-on option;
generate a unique code associated with the authentication event;
display the unique code to the user on the computing device;
receive, from the mobile device, from the user, the unique code;
determine, using a global positioning system, a location of the mobile device in relation to the computing device;
send an authentication prompt from the system to the mobile device, based on receiving the unique code and on the location of the mobile device in relation to the computing device, wherein the authentication prompt comprises an invocation for authentication;
receive, on the mobile device, in response to the invocation for authentication, the online banking account authentication credentials from the user wherein the online banking account credentials are selected from the group consisting of: a username and password combination, biometric authentication credentials, and a combination thereof; and
validate the user on the computing device, based on matching the online banking authentication credentials from the user with stored authentication credentials within the online banking system.

2. The system of claim 1, wherein the executable code, when executed, further causes the processor to:
receive a request, from the user, on the computing device, to disable one or more of the selection of authentication methods; and
disable the one or more of the selection of authentication methods, based on the request;
wherein disabling the one or more of the selection of authentication methods comprises removing the one or more of the selection of authentication methods from the selection of authentication methods displayed on the computing device.

3. The system of claim 1, wherein the authentication credentials comprise a biometric authentication, and wherein the stored authentication credentials within the online banking account comprise biometric data for the user.

4. The system of claim 3, wherein the biometric authentication credentials comprise is a fingerprint-scan, a facial-scan, a retinal-scan, an iris-scan, a voice-scan, and/or a vascular-scan.

5. The system of claim 1, wherein the mobile device is not pre-associated with the online banking account of the user.

6. The system of claim 1, wherein the executable code, when executed, further causes the at least one processor to regenerate the unique code after a pre-determined period of time.

7. A system for alternative authentication comprising:
at least one processor;
a communication interface communicatively coupled to the at least one processor; and
a memory device storing executable code that, when executed, causes the processor to:
display, on a computing device, a selection of authentication options for authenticating a user of an online banking account, wherein the selection of authentication options comprises a username and password combination option and an alternative sign-on option, wherein the alternative sign-on option comprises authentication using a mobile device;

receive, from a user on the computing device, an authentication event comprising a user-selected authentication option from the selection of authentication options displayed on the computing device;

receive authentication credentials from the user;

validate the user, based on the authentication credentials, within the online banking account on the computing device;

receive a request, from the user on the computing device, to disable the username and password combination option from the selection of authentication options;

disable the username and password combination option from the selection of authentication options, based on the request;

display, on the computing device, a new user-selection of authentication options for authenticating the user of the online banking account, wherein the new user-selection of authentication options does not comprise the username and password combination option;

receive, from the user on the computing device a second authentication event comprising a selection of the alternative sign-on option from the selection of authentication options;

generate a unique code associated with the second authentication event;

display the unique code to the user on the computing device;

receive, from a mobile device, from the user, the unique code; and determine, using a global positioning system, a location of the mobile device in relation to the computing device;

send an authentication prompt from the system to the mobile device, based on receiving the unique code and on the location of the mobile device in relation to the computing device, to wherein the authentication prompt comprises an invocation for authentication.

8. The system of claim 7, wherein the executable code, when executed, further causes the at least one processor to:

receive, on the mobile device, in response to the invocation for authentication, biometric authentication credentials from the user; and validate the user on the computing device, based on matching the biometric authentication credentials with stored biometric authentication credentials within the online banking account.

9. The system of claim 7, wherein the executable code, when executed, further causes the at least one processor to regenerate the unique code after a pre-determined period of time.

10. The system of claim 8, wherein the biometric authentication credentials comprise a fingerprint-scan, a facial-scan, a retinal-scan, an iris-scan, a voice-scan, and/or a vascular-scan.

11. A method for alternative authentication, the method comprising:

displaying, on a computing device, a selection of authentication options for authenticating a user of an online banking account, wherein the selection of authentication options comprises a username and password combination option and an alternative sign-on option, wherein the alternative sign-on option comprises authentication using a mobile device;

receiving, from a computing device, from the user, an authentication event comprising a user selection of the alternative sign-on option;

generating a unique code associated with the authentication event;

displaying the unique code to the user on the computing device;

receiving, from a mobile device, from the user, the unique code;

determining, using a global positioning system, a location of the mobile device in relation to the computing device;

sending an authentication prompt from an authentication system to the mobile device, based on receiving the unique code and on the location of the mobile device in relation to the computing device, wherein the authentication prompt comprises an invocation for authentication;

receiving, on the mobile device, in response to the invocation for authentication, the online banking authentication credentials from the user, wherein the online banking account credentials are selected from the group consisting of: a username and password combination, biometric authentication credentials, and a combination thereof; and validating the user on the computing device, based on matching the online banking authentication credentials from the user with stored authentication credentials within the online banking system.

12. The method of claim 11, further comprising, prior to receiving the authentication event:

receiving a request, from the user on the computing device, to disable one or more of the selection of authentication methods;

disabling the one or more of the selection of authentication methods, based on the request; and receiving a log-out event from the mobile device;

wherein disabling the one or more of the selection of authentication methods comprises removing the one or more of the selection of authentication methods from the selection of authentication methods displayed on the computing device.

13. The method of claim 11, further comprising regenerating the unique code after a pre-determined period of time.

14. The system of claim 1, wherein there is no requirement to register the mobile device with the online banking account prior to authentication.

* * * * *